(12) United States Patent
Urushidani (10) Patent No.: US 10,641,278 B2
(45) Date of Patent: May 5, 2020

(54) SEALING DEVICE AND ROTATING MACHINE

(71) Applicant: MITSUBISHI HEAVY INDUSTRIES COMPRESSOR CORPORATION, Tokyo (JP)

(72) Inventor: Hiroki Urushidani, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 15 days.

(21) Appl. No.: 15/778,909

(22) PCT Filed: Jan. 18, 2016

(86) PCT No.: PCT/JP2016/051230
§ 371 (c)(1),
(2) Date: May 24, 2018

(87) PCT Pub. No.: WO2017/125995
PCT Pub. Date: Jul. 27, 2017

(65) Prior Publication Data
US 2018/0355880 A1 Dec. 13, 2018

(51) Int. Cl.
*F04D 29/12* (2006.01)
*F16J 15/447* (2006.01)
(Continued)

(52) U.S. Cl.
CPC ............ *F04D 29/12* (2013.01); *F04D 17/122* (2013.01); *F04D 29/056* (2013.01); *F04D 29/06* (2013.01);
(Continued)

(58) Field of Classification Search
CPC ...... F16J 15/3464; F16J 15/447; F04D 29/12; F04D 29/056; F04D 29/06; F04D 29/102; F04D 17/122; F16B 33/004
See application file for complete search history.

(56) References Cited

U.S. PATENT DOCUMENTS 5,462,420 A * 10/1995 Stehr ................... F04C 15/0038
277/412
6,145,844 A * 11/2000 Waggott ................ F01D 11/025
277/412
(Continued)

FOREIGN PATENT DOCUMENTS

JP    H02-121605 U    10/1990
JP    2010-121463 A    6/2010
(Continued)

OTHER PUBLICATIONS

International Search Report for corresponding International Application No. PCT/JP2016/051230, dated Mar. 8, 2016 (4 pages).
(Continued)

*Primary Examiner* — Gilbert Y Lee
(74) *Attorney, Agent, or Firm* — Osha Liang LLP (57) ABSTRACT

A sealing device includes: a sealing body that seals a gap between a rotor and the sealing body; a fastening bolt that fixes the sealing body to a stator; and a bolt sealing part that seals a gap around the fastening bolt. The sealing body includes: a facing surface that faces a fixing surface of the stator facing in an axial direction; and a body through-hole that penetrates the sealing body and opens on the facing surface. The bolt sealing part is disposed in a gap between a head portion and the inner peripheral surface of the body through-hole, or between the fixing surface and the facing surface.

5 Claims, 5 Drawing Sheets

(51) Int. Cl.
*F16J 15/34* (2006.01)
*F16B 33/00* (2006.01)
*F04D 29/10* (2006.01)
*F04D 17/12* (2006.01)
*F04D 29/056* (2006.01)
*F04D 29/06* (2006.01)

(52) U.S. Cl.
CPC .......... *F04D 29/102* (2013.01); *F16B 33/004* (2013.01); *F16J 15/3464* (2013.01); *F16J 15/447* (2013.01)

(56) References Cited

U.S. PATENT DOCUMENTS

| | | | | |
|---|---|---|---|---|
| 6,220,603 | B1* | 4/2001 | Brandon | F01D 11/025 |
| | | | | 277/412 |
| 6,325,382 | B1* | 12/2001 | Iwamoto | F16J 15/3404 |
| | | | | 277/368 |
| 6,461,115 | B1 | 10/2002 | Ferrier et al. | |
| 6,550,777 | B2* | 4/2003 | Turnquist | F16J 15/3288 |
| | | | | 277/355 |
| 2002/0117807 | A1* | 8/2002 | Yoshida | F16J 15/3292 |
| | | | | 277/412 |

FOREIGN PATENT DOCUMENTS

| | | |
|---|---|---|
| JP | 2011-032908 A | 2/2011 |
| JP | 4980699 B2 | 7/2012 |
| WO | 2012/002812 A1 | 1/2012 |

OTHER PUBLICATIONS

Written Opinion for corresponding International Application No. PCT/JP2016/051230, dated Mar. 8, 2016 (6 pages).

* cited by examiner

SEALING DEVICE AND ROTATING MACHINE

TECHNICAL FIELD

The present invention relates to a sealing device and a rotating machine.

BACKGROUND

In various rotating machines including a compressor, a turbine, and the like, lubricating oil is supplied to bearings supporting a rotor. Each of the bearings forms an oil film between the rotor and itself with the lubricating oil, and supports the rotor without restraining the rotation of the rotor.

For example, in a centrifugal compressor disclosed in Patent Document 1, a shaft, which is a rotor, is supported by journal bearings and thrust bearings. The centrifugal compressor is provided with a gas seal. The gas seal seals a gap between the rotor and a casing so that working fluid flowing in a flow passage formed in the casing serving as a stator does not leak to the outside of the casing.

The above-mentioned gas seal includes a rotating ring and a stationary ring. The rotating ring is provided integrally with the rotor. The stationary ring is fixed to the casing, and is provided so as to oppose the rotating ring in the axial direction of the rotor. The stationary ring is pushed against the rotating ring by a coil spring or the like. Accordingly, the stationary ring and the rotating ring are brought into contact with each other so as to push each other in a state in which the rotating machine is stopped. Further, a groove is formed on the surface of the rotating ring opposite to the stationary ring. In a case in which the rotating machine is operated and a rotating shaft is rotated in a state in which seal gas is supplied, the seal gas is introduced between the rotating ring and the stationary ring by the groove. The stationary ring is pushed against the biasing force of the coil spring in the axial direction of the rotor by the pressure of the seal gas. As a result, a small gap is formed between the rotating ring and the stationary ring. The seal gas is supplied to the gap, so that a gap between the rotor and the casing is sealed.

In a sealing device, such as the above-mentioned gas seal, liquid, such as lubricating oil, used for a bearing or the like needs to be made not to enter the gap of a gas sheath to ensure sealing performance. For this purpose, another sealing device, such as a labyrinth seal, is provided between the bearing and the gas seal. In another sealing device, a sealing body provided with a labyrinth seal or the like is fixed to a stator such as a casing.

CITATION LIST

Patent Literature

[Patent Document 1] Japanese Patent No. 4980699

However, when the sealing body is fixed to the stator by a fastening bolt, there is a possibility that lubricating oil flows in from a gap around the fastening bolt. For this reason, there is a demand to improve sealing performance around the fastening bolt. However, assemblability deteriorates in a case in which a fixing structure other than the fastening bolt is used or a complicated sealing structure, such as a gas seal, is disposed around the fastening bolt to improve sealing performance.

SUMMARY

One or more embodiments of the invention provide a sealing device and a rotating machine that can improve sealing performance around a fastening bolt without the impairment of assemblability.

A sealing device according to one or more embodiments of the invention is provided between a rotor extending along an axis as a center and a stator disposed on an outer peripheral side of the rotor. The sealing device includes a sealing body that seals a gap between the rotor and itself, a fastening bolt that fixes the sealing body to the stator, and a bolt sealing part that is disposed so as to cover a central axis of the fastening bolt and seals a gap around the fastening bolt. The sealing body includes a facing surface that opposes a fixing surface of the stator facing in an axial direction in which the axis extends, and a body through-hole that penetrates the sealing body so as to be opened on the facing surface. A head portion of the fastening bolt is inserted into the body through-hole and a tip portion of the fastening bolt is fixed to a fixing hole formed on the fixing surface. The bolt sealing part is provided in at least one of a gap between the head portion and an inner peripheral surface of the body through-hole and a gap between the fixing surface and the facing surface.

According to one or more embodiments, it is possible to restrain liquid from flowing beyond the sealing body through the body through-hole that is formed to fix the sealing body to the stator. Further, since the bolt sealing part seals at least one of a gap between the head portion and the body through-hole and a gap between the fixing surface and the facing surface, it is possible to ensure sealing performance around the fastening bolt without using a fixing structure other than the fastening bolt or a complicated sealing structure, such as a gas seal.

According to one or more embodiments of the invention, in the sealing device, the bolt sealing part may be an O-ring that is fixed to the head portion.

According to one or more embodiments, it is possible to ensure sealing performance around the fastening bolt with a simple structure.

According to one or more embodiments of the invention, the sealing device may further include a ring member that includes a ring member that includes a first ring-facing surface opposite to the facing surface, a second ring-facing surface opposite to the fixing surface, and a ring through-hole into which the fastening bolt is inserted and thereby penetrates toward the second ring-facing surface from the first ring-facing surface, and the bolt sealing part may be provided between the facing surface and the first ring-facing surface and between the fixing surface and the second ring-facing surface.

According to one or more embodiments, since the sealing device includes the ring member, it is possible to flexibly adjust the position of the sealing body relative to the stator. Accordingly, it is possible to improve assemblability.

A rotating machine according to one or more embodiments of the invention includes a stator, a rotor that is supported so as to be rotatable relative to the stator, and the sealing device according to the above embodiments.

According to one or more embodiments of the invention, it is possible to improve the sealing performance around a fastening bolt without the impairment of assemblability.

DETAILED DESCRIPTION

Embodiments of the invention will be described below with reference to FIGS. 1 and 2.

Figure 1:
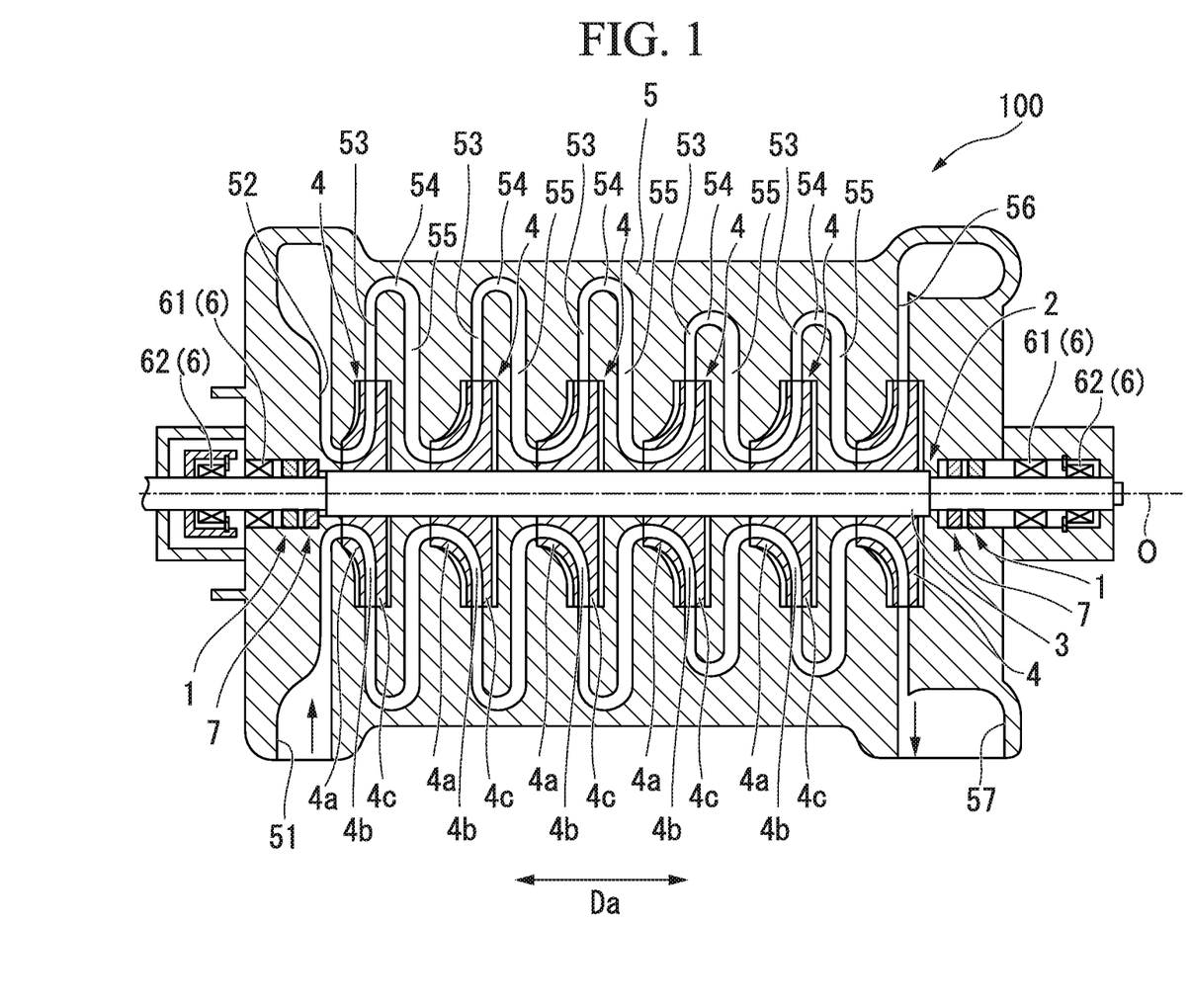
FIG. 1 is a cross-sectional view showing the entire structure of a multi-stage centrifugal compressor according to one or more embodiments of the invention.

As shown in FIG. 1, a rotating machine in accordance with one or more embodiments is a single-shaft multi-stage centrifugal compressor (multi-stage centrifugal compressor) 100 that includes a plurality of impellers 4. The centrifugal compressor 100 in accordance with one or more embodiments includes a rotor 2, a casing 5, bearing units 6, main sealing parts 7, and sealing devices 1.

The rotor 2 is rotated about an axis O. The rotor 2 includes a rotor body (rotating shaft) 3 that extends along the axis O and the plurality of impellers 4 that are rotated together with the rotor body 3.

A driving machine (not shown), such as a motor, is connected to the rotor body 3. The rotor body 3 is rotationally driven by the driving machine. The rotor body 3 is formed in the shape of a column having a center on the axis O, and extends in an axial direction Da in which the axis O extends. The rotor 2 is supported by the bearing units 6 so as to be rotatable about the axis O.

The impellers 4 are fixed to the outer surface of the rotor body 3. The impellers 4 compress process gas (working fluid) with a centrifugal force by being rotated together with the rotor body 3. The impellers 4 are provided on the rotor body 3 so as to form a plurality of stages in the axial direction Da. Each of the impellers 4 is a so-called closed impeller that includes a disc 4a, blades 4b, and a cover 4c.

The disc 4a is formed in the shape of a disc of which the diameter is gradually increased outward in the radial direction of the rotor body 3 from one side toward the other side in the axial direction Da of the rotor body 3.

Here, one side in the axial direction Da is an upstream side in a case in which process gas flows in the centrifugal compressor 100, and is a left side in the plane of FIG. 1. Further, the other side in the axial direction Da is a downstream side in a case in which process gas flows, and is a right side in the plane of FIG. 1. That is, the other side in the axial direction Da is the side opposite to one side.

The blade 4b is formed so as to protrude from the disc 4a toward one side in the axial direction Da. The plurality of blades 4b are formed at predetermined intervals in the circumferential direction of the rotor body 3.

The cover 4c covers the plurality of blades 4b from the side opposite to the disc 4a in the axial direction Da. The cover 4c is formed in the shape of a disc facing the disc 4a.

The casing 5 forms the exterior of the centrifugal compressor 100. The casing 5 is a part of a stator that covers the rotor 2 from the outer peripheral side. The casing 5 is formed in a cylindrical shape. The casing 5 is formed so that the central axis of the casing 5 coincides with an axis O of the rotor body 3. The bearing units 6 are provided at both end portions of the casing 5 in the axial direction Da. A flow passage in which process gas flows is formed in the casing 5. Specifically, a suction port 51, a suction flow passage 52, a plurality of diffuser flow passages 53, a plurality of bent flow passages 54, return flow passages 55, a discharge flow passage 56, and a discharge port 57 are formed in the casing 5 in this order from the upstream side toward the downstream side in the axial direction Da.

The bearing units 6 are received in the casing 5 and support the rotor body 3 to allow the rotor body 3 to be rotatable. The bearing units 6 in accordance with one or more embodiments include a plurality of journal bearings 61 and a plurality of thrust bearings 62.

The journal bearings 61 support a load that is applied to the rotor body 3 in the radial direction having a reference on the axis O. The journal bearings 61 are disposed on both ends of the rotor body 3 in the axial direction Da so that the plurality of impellers 4 are interposed between the journal bearings 61 in the axial direction Da.

The thrust bearings 62 support a load that is applied to the rotor body 3 in the axial direction Da. The thrust bearings 62 are disposed outside the journal bearings 61 in the axial direction Da on both ends of the rotor body 3 in the axial direction Da.

Each of the main sealing parts 7 seals a gap between the rotor 2 and the casing 5. That is, each of the main sealing parts 7 seals a gap between the inside of the machine that is the inside of the casing 5 where the impellers 4 are disposed and the outside of the machine that communicates with the external space. For example, a dry gas seal, which uses seal gas for sealing, is used as each of the main sealing parts 7 in accordance with one or more embodiments. The main sealing parts 7 are fixed to the casing 5 at end portions of the rotor body 3. Each main sealing part 7 is disposed in the casing 5 on one side of the bearing unit 6 close to the inside of the machine. The main sealing parts 7 in accordance with one or more embodiments are provided on both ends of one rotor body 3, respectively.

The main sealing part 7 is not limited to a sealing structure using dry gas, and has only to have a structure that can seal a gap between the rotor 2 and the casing 5. For example, a labyrinth seal or an oil seal may be used as the main sealing part 7.

The sealing devices 1 are disposed between the rotor 2 that extends along the axis O as a center and the casing 5 that is disposed on the outer peripheral side of the rotor 2. Each of the sealing devices 1 seals a gap between the main sealing part 7 and the bearing unit 6. That is, each of the sealing devices 1 is disposed between the main sealing part 7 and the bearing unit 6. The sealing devices 1 in accordance with one or more embodiments are provided on both ends of one rotor body 3, respectively. As shown in FIG. 2, the sealing device 1 includes a fixing target part 11, a sealing body 12, a fastening bolt 13, a stop ring 14, and a bolt sealing part 15.

Figure 2:
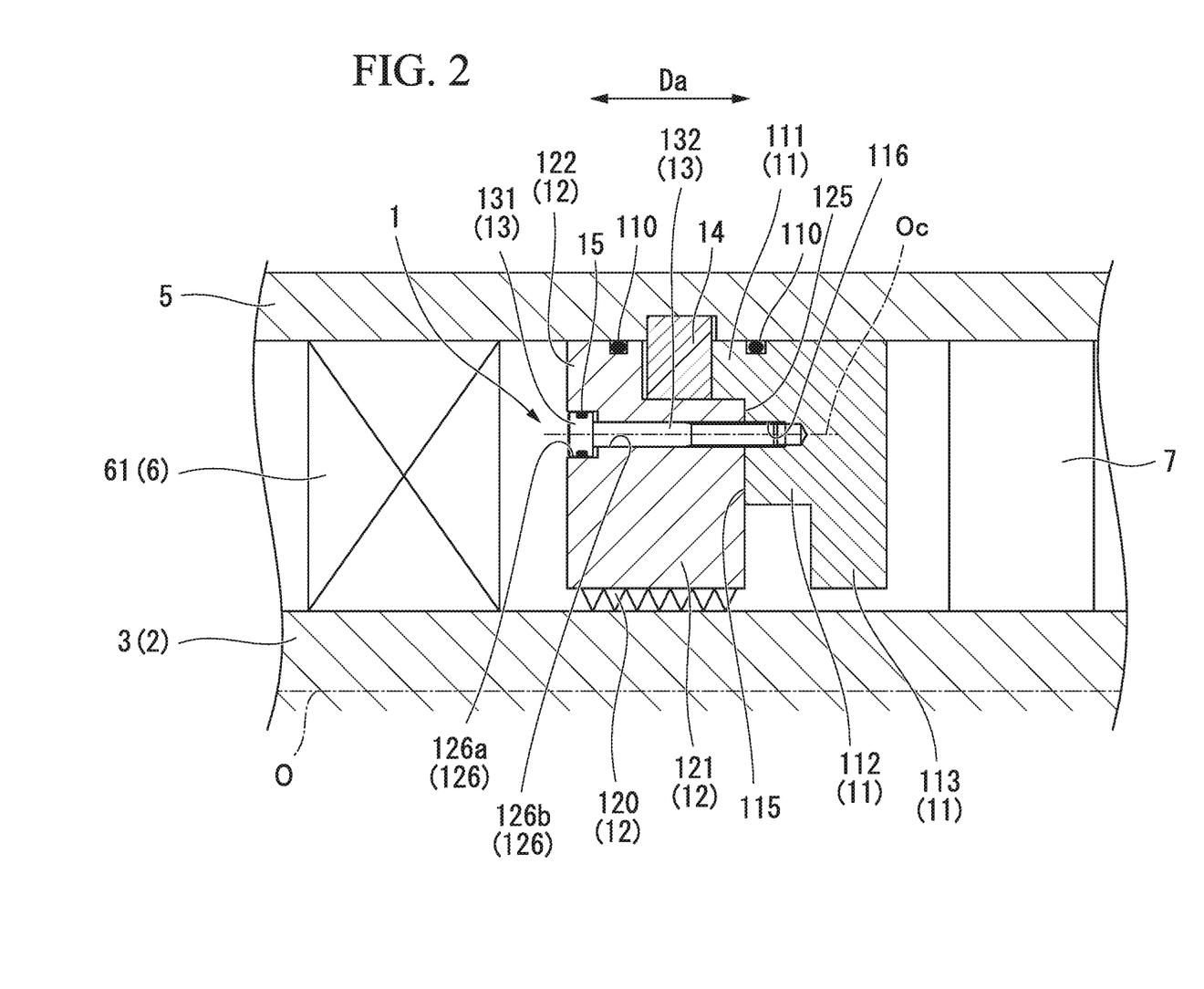
FIG. 2 is a cross-sectional view of a sealing device according to one or more embodiments of the invention.

Here, in FIG. 2, the outside of the machine is one side of the sealing device 1 on which the bearing unit 6 is disposed and is one side in the axial direction Da. Further, the inside of the machine is one side of the sealing device 1 on which the main sealing part 7 is disposed and is the other side in the axial direction Da.

The fixing target part 11 is a part of the stator, and the sealing body 12 is fixed to the fixing target part 11. The fixing target part 11 and the casing 5 are fixed to each other. The fixing target part 11 is a cylindrical member that is formed so as to cover the rotor body 3. The fixing target part 11 includes a first fixing target portion 111, a second fixing target portion 112, and a third fixing target portion 113 disposed in this order toward the inside in the radial direction that is the rotor body 3 side from the outside in the radial direction that is the casing 5 side.

The first fixing target portion 111 is formed in the shape of a cylinder having a center on the axis O. The outer peripheral surface of the first fixing target portion 111 is fixed to the outer peripheral surface of the casing 5. An O-ring 110 is provided on the outer peripheral surface of the first fixing target portion 111. A gap between the first fixing target portion 111 and the casing 5 is sealed by the O-ring 110.

The second fixing target portion 112 is formed in the shape of a cylinder having a center on the axis O. The second fixing target portion 112 is disposed inside the first fixing target portion 111 in the radial direction. The second fixing target portion 112 is integrated with the first fixing target portion 111 in a state in which the surface of the second fixing target portion 112 facing the outside of the machine in the axial direction Da is disposed at the same position as the first fixing target portion 111. A fixing surface 115, which faces in the axial direction Da in which the axis O extends, is formed on the second fixing target portion 112.

The fixing surface 115 is a flat surface that is orthogonal to the axis O so as to face the outside of the machine. The fixing surface 115 is disposed closer to the inside of the machine in the axial direction Da than the surface of the first fixing target portion 111 facing the outside of the machine. That is, the second fixing target portion 112 forms flat surfaces together with the first fixing target portion 111 on the outside of the machine while forming a difference in level together with the first fixing target portion 111 on the outside of the machine. A fixing hole 116 into which a fastening bolt 13 to be described later can be screwed is formed on the fixing surface 115. The fixing hole 116 is recessed in the axial direction Da toward the inside of the machine from the fixing surface 115.

The third fixing target portion 113 is formed in the shape of a cylinder having a center on the axis O. The third fixing target portion 113 is disposed inside the second fixing target portion 112 in the radial direction. The third fixing target portion 113 is disposed with an interval between the outer peripheral surface of the rotor body 3 and itself in the radial direction. The third fixing target portion 113 is integrated with the second fixing target portion 112 in a state in which the surface of the third fixing target portion 113 facing the other side in the axial direction Da, which is the inside of the machine, is disposed at the same position as the second fixing target portion 112. The surface of the third fixing target portion 113, which faces the outside of the machine in the axial direction Da, is disposed closer to the inside of the machine in the axial direction Da than the surface of the second fixing target portion 112 facing the outside of the machine. That is, the third fixing target portion 113 forms flat surfaces together with the second fixing target portion 112 on the outside of the machine while forming a difference in level together with the second fixing target portion 112 on the outside of the machine.

The sealing body 12 seals a gap between the rotor 2 and itself. The sealing body 12 is fixed to the fixing target part 11 by the fastening bolt 13. The sealing body 12 and the casing 5 are not directly fixed to each other. The sealing body 12 is a cylindrical member that is formed so as to cover the rotor body 3. The sealing body 12 includes a labyrinth seal portion 120, a first body portion 121, and a second body portion 122.

The labyrinth seal portion 120 seals a gap between the first body portion 121 and the outer peripheral surface of the rotor body 3. The labyrinth seal portion 120 includes a plurality of fins that extend toward the outer peripheral surface of the rotor body 3 from the first body portion 121.

The first body portion 121 is formed in the shape of a cylinder having a center on the axis O. The first body portion 121 is disposed inside the labyrinth seal portion 120 in the radial direction. The first body portion 121 is integrated with the labyrinth seal portion 120. A facing surface 125, which opposes the fixing surface 115, is formed on the first body portion 121. The facing surface 125 is a flat surface that is orthogonal to the axis O so as to face the inside of the machine on the contrary to the fixing surface 115. The facing surface 125 in accordance with one or more embodiments is in contact with the fixing surface 115. The first body portion 121 includes a body through-hole 126 that is formed so as to be opened on a surface of the first body portion 121 facing the outside of the machine in the axial direction Da and the facing surface 125.

The body through-hole 126 penetrates the first body portion 121 in the axial direction Da. The body through-hole 126 is formed so that the central axis of the body through-hole 126 is disposed at the same position as the central axis of the fixing hole 116. The body through-hole 126 includes a first through-hole 126*a* and a second through-hole 126*b*.

The first through-hole 126*a* is recessed from the surface of the first body portion 121, which faces the outside of the machine in the axial direction Da, in the axial direction Da. The first through-hole 126*a* is a hole that has a circular cross-section. The first through-hole 126*a* is formed so as to have a size that allows a head portion 132 of the fastening bolt 13 to be described later to be inserted into the first through-hole 126*a*.

The second through-hole 126*b* is recessed to the outside of the machine from the facing surface 125 toward the first through-hole 126*a*. The second through-hole 126*b* is a hole that has a circular cross-section and has a diameter smaller than the diameter of the first through-hole 126*a*. The second through-hole 126*b* is formed so as to have a size that allows a bolt body 131 of the fastening bolt 13 to be described later to be inserted into the second through-hole 126*b*. That is, the second through-hole 126*b* is formed so as to have a size that allows the bolt body 131 of the fastening bolt 13 to be inserted into the second through-hole 126*b* but does not allow the head portion 132 to be inserted into the second through-hole 126*b*.

The second body portion 122 is formed in the shape of a cylinder having a center on the axis O. The second body portion 122 is disposed outside the first body portion 121 in the radial direction. The second body portion 122 is disposed so that the outer peripheral surface of the second body portion 122 is in sliding contact with the outer peripheral surface of the casing 5. An O-ring 110 is provided on the outer peripheral surface of the second body portion 122. A gap between the second body portion 122 and the casing 5 is sealed by the O-ring 110. The second body portion 122 is integrated with the first body portion 121 in a state in which the surface of the second body portion 122 facing the other side in the axial direction Da, which is the outside of the machine, is disposed at the same position as the first body portion 121. The surface of the second body portion 122, which faces the inside of the machine in the axial direction Da, is disposed closer to the outside of the machine in the axial direction Da than the facing surface 125. That is, the second body portion 122 forms flat surfaces together with the first body portion 121 on the inside of the machine while forming a difference in level together with the first body portion 121 on the inside of the machine.

The fastening bolt 13 fixes the sealing body 12 to the fixing target part 11. The fastening bolt 13 includes the bolt body 131 and the head portion 132. The head portion 132 of the fastening bolt 13 is inserted into the body through-hole 126 and a tip portion of the fastening bolt 13 is fixed to the fixing hole 116.

A tip portion of the bolt body 131 is screwed and fixed to the fixing hole 116 in a state in which the bolt body 131 is inserted into the body through-hole 126. The bolt body 131 is formed in the shape of a column that has a center on a central axis Oc and extends in the axial direction Da. A spiral thread, which is engaged with the fixing hole 116, is formed on the outer surface of the tip portion of the bolt body 131. The bolt body 131 is inserted into the second through-hole 126b and screwed to the fixing hole 116 at a position where the central axis Oc coincides with the central axis of the second through-hole 126b and the central axis of the fixing hole 116.

The head portion 132 is provided on the side of the bolt body 131 opposite to the tip portion. The head portion 132 is inserted into the body through-hole 126. The head portion 132 is formed so as to have a size that allows the head portion 132 to be inserted into the first through-hole 126a but does not allow the head portion 132 to be inserted into the second through-hole 126b.

The stop ring 14 positions the fixing target part 11, the sealing body 12, and the casing 5 in the axial direction Da. The stop ring 14 is formed in the shape of a ring that has a center on the axis O. The stop ring 14 is disposed so as to be fitted to a recess that is formed on the surface of the casing 5 facing the inside in the radial direction. The stop ring 14 is disposed in a state in which the surface of the stop ring 14 facing the inside in the radial direction is in contact with the surface of the first body portion 121 facing the outside in the radial direction. The stop ring 14 is disposed in a state in which the surface of the stop ring 14 facing the inside of the machine in the axial direction Da is in contact with the surface of the first fixing target portion 111 facing the outside of the machine. The stop ring 14 is disposed in a state in which a gap is formed between the surface of the stop ring 14 facing the outside of the machine in the axial direction Da and the surface of the second body portion 122 facing the inside of the machine.

The bolt sealing part 15 is disposed so as to cover the central axis Oc of the fastening bolt 13 and seals a gap around the fastening bolt 13. The bolt sealing part 15 is provided in at least one of a gap between the head portion 132 of the fastening bolt 13 and the inner peripheral surface of the first through-hole 126a and a gap between the fixing surface 115 and the facing surface 125. The bolt sealing part 15 in accordance with one or more embodiments is provided between the head portion 132 of the fastening bolt 13 and the inner peripheral surface of the first through-hole 126a. The bolt sealing part 15 is an O-ring that is fixed to the head portion 132. The bolt sealing part 15 is disposed so as to cover the outer peripheral surface of the head portion 132.

Since the rotor body 3 is rotated in the above-mentioned centrifugal compressor 100, there is a case where lubricating oil (liquid), which is used for the journal bearings 61 to support the rotor body 3, leaks to the sealing devices 1 from the journal bearings 61. A gap between the inner peripheral surface of the sealing body 12 and the outer peripheral surface of the rotor body 3 is sealed by the labyrinth seal portion 120. For this reason, it is possible to prevent the lubricating oil, which has leaked, from flowing into the inside of the machine where the main sealing part 7 is disposed from the gap between the sealing body 12 and the rotor body 3 by the labyrinth seal portion 120.

Further, the lubricating oil, which has leaked to the sealing device 1 from the journal bearing 61, flows to a gap around the first through-hole 126a from the surface of the first body portion 121 that faces the outside of the machine. However, according to the centrifugal compressor 100 and the sealing device 1 in accordance with one or more embodiments, an O-ring is provided on the head portion 132 of the fastening bolt 13 as the bolt sealing part 15. It is possible to seal a gap between the outer peripheral surface of the head portion 132 and the inner peripheral surface of the first through-hole 126a by the O-ring. Accordingly, it is possible to restrain liquid from flowing to the main sealing part 7 beyond the sealing body 12 through the body through-hole 126 that is formed to fix the sealing body 12 to the fixing target part 11. Furthermore, the sealing device 1 has a sealing structure in which an O-ring is merely provided on the head portion 132 of the fastening bolt 13. For this reason, since a gap between the head portion 132 and the first through-hole 126a is sealed by the bolt sealing part 15, it is possible to ensure sealing performance around the fastening bolt 13 without using a fixing structure other than the fastening bolt 13 or a complicated sealing structure, such as a gas seal. Accordingly, it is possible to improve sealing performance around the fastening bolt 13 without the deterioration of assemblability.

Moreover, since the O-ring fixed to the head portion 132 is used as the bolt sealing part 15, it is possible to ensure sealing performance around the fastening bolt 13 by merely inserting the fastening bolt 13 into the body through-hole 126 and fixing the fastening bolt 13 to the fixing hole 116. That is, it is possible to ensure sealing performance around the fastening bolt 13 with a simple structure.

Figure 3:
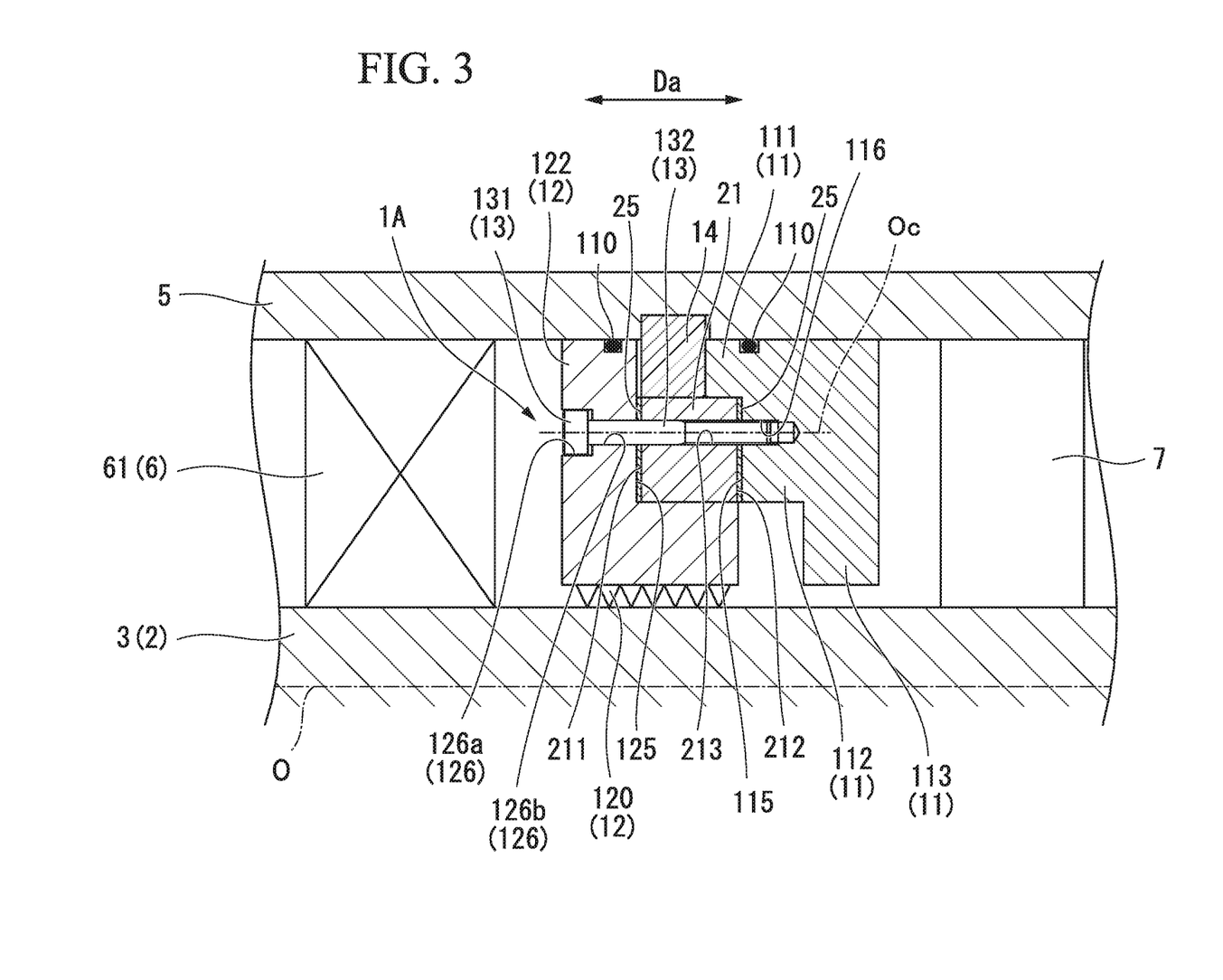
FIG. 3 is a cross-sectional view of a sealing device according to one or more embodiments of the invention.

Next, a sealing device in accordance with one or more embodiments will be described with reference to FIG. 3.

The same components of these embodiments as the components of one or more embodiments above will be denoted by the same reference numerals as the reference numerals of those embodiments, and the detailed description thereof will be omitted. The sealing device of these embodiments are different from the sealing device of those embodiments above in terms of the fact that a ring member is provided and the structure of bolt sealing parts.

The sealing device 1A in accordance with one or more embodiments includes a ring member 21 that is provided between the fixing target part 11 and a sealing body 12. In the sealing device 1A in accordance with one or more embodiments, bolt sealing parts 25 are not provided between the head portion 132 of the fastening bolt 13 and the inner peripheral surface of the second through-hole 126b and are provided between the fixing surface 115 and the facing surface 125.

The ring member 21 is formed in the shape of a cylinder having a center on an axis O. The ring member 21 in accordance with one or more embodiments is a ring that is different from the stop ring 14 used in one or more embodiments above. According to one or more embodiments, the ring member 21 is disposed radially inward of the stop ring 14 so as to be interposed between the sealing body 12 and the fixing target part 11.

Specifically, the ring member 21 is disposed in a state in which the surface of the ring member 21 facing the inside in the radial direction is in contact with the surface of the first body portion 121 facing the outside in the radial direction. The ring member 21 is disposed in a state in which the surface of the ring member 21 facing the outside in the radial direction is in contact with the surface of the stop ring 14 facing the inside in the radial direction. The ring member 21 includes a labyrinth seal-facing surface (first ring-facing surface) 211 that opposes the facing surface 125 on the outside of the machine in the axial direction Da. The labyrinth seal-facing surface 211 is a flat surface that is orthogonal to the axis O so as to face the inside of the machine on the contrary to the fixing surface 115. The ring member 21 includes a fixing target part-facing surface (second ring-facing surface) 212 that faces the fixing surface 115 on the inside of the machine in the axial direction Da. The fixing target part-facing surface 212 is a flat surface that is orthogonal to the axis O so as to face the outside of the machine on the contrary to the labyrinth seal-facing surface 211. The ring member 21 includes a ring through-hole 213 that is formed so as to be opened on the labyrinth seal-facing surface 211 and the fixing target part-facing surface 212.

The ring through-hole 213 penetrates the ring member 21 in the axial direction Da toward the fixing target part-facing surface 212 from the labyrinth seal-facing surface 211, and the fastening bolt 13 is inserted into the ring through-hole 213. The ring through-hole 213 is formed so that the central axis of the ring through-hole 213 is disposed at the same position as the central axes of the fixing hole 116 and the body through-hole 126. The ring through-hole 213 is a hole that has a circular cross-section. The ring through-hole 213 is formed so as to have a size that allows the bolt body 131 to be inserted into the ring through-hole 213.

The bolt sealing parts 25 in accordance with one or more embodiments are indirectly provided between the fixing surface 115 and the facing surface 125 through the ring member 21. The bolt sealing part 25 is provided between the facing surface 125 and the labyrinth seal-facing surface 211, and the bolt sealing part 25 is provided between the fixing surface 115 and the fixing target part-facing surface 212. Each of the bolt sealing parts 25 in accordance with one or more embodiments is a gasket. The bolt sealing part 25 is disposed between the facing surface 125 and the labyrinth seal-facing surface 211 so as to cover the ring through-hole 213 from the outside in the radial direction. The bolt sealing part 25 is disposed between the fixing surface 115 and the fixing target part-facing surface 212 so as to cover the ring through-hole 213 from the outside in the radial direction.

According to the centrifugal compressor 100 and the sealing device 1A in accordance with one or more embodiments, a gasket is provided between the facing surface 125 and the labyrinth seal-facing surface 211 and a gasket is provided between the fixing surface 115 and the fixing target part-facing surface 212 as the bolt sealing parts 25. The gaskets can seal a gap between the facing surface 125 and the labyrinth seal-facing surface 211 and a gap between the fixing surface 115 and the fixing target part-facing surface 212, respectively, so as to cover the ring through-hole 213, into which the bolt body 131 is inserted, from the outside in the radial direction. Accordingly, even though liquid flows to the ring member 21 through the body through-hole 126, it is possible to restrain the liquid from leaking from the gap between the facing surface 125 and the labyrinth seal-facing surface 211 by the gasket. In addition, even if liquid flows to the fixing target part 11 through the ring through-hole 213, it is possible to restrain the liquid from leaking from the gap between the fixing surface 115 and the fixing target part-facing surface 212 by the gasket. That is, it is possible to restrain the liquid, which has flowed through the body through-hole 126, from flowing to the main sealing part 7 beyond the sealing body 12. For this reason, since a gap between the facing surface 125 and the labyrinth seal-facing surface 211 and a gap between the fixing surface 115 and the fixing target part-facing surface 212 are sealed by the bolt sealing parts 15, it is possible to ensure sealing performance around the fastening bolt 13 without using a fixing structure other than the fastening bolt 13 or a complicated sealing structure, such as a gas seal.

Further, since the sealing device 1A includes the ring member 21 in addition to the stop ring 14, it is possible to flexibly adjust the position of the sealing body 12 relative to the fixing target part 11. Accordingly, it is possible to improve assemblability.

The bolt sealing part 25 in accordance with one or more embodiments is not limited to a gasket, and has only to seal a gap between surfaces opposite to each other. For example, the bolt sealing part 25 in accordance with one or more embodiments may be an O-ring that is disposed so as to cover the ring through-hole 213 from the outside in the radial direction.

The embodiments of the invention have been described above in detail with reference to the drawings, but the respective components of the respective embodiments, the combinations thereof, and the like are exemplary. Embodiments of the invention may have an addition, omission, and replacement of components, and various other modifications without departing from the scope of the invention. Further, the invention is limited only by the claims and without being limited by the embodiments.

Figure 4:
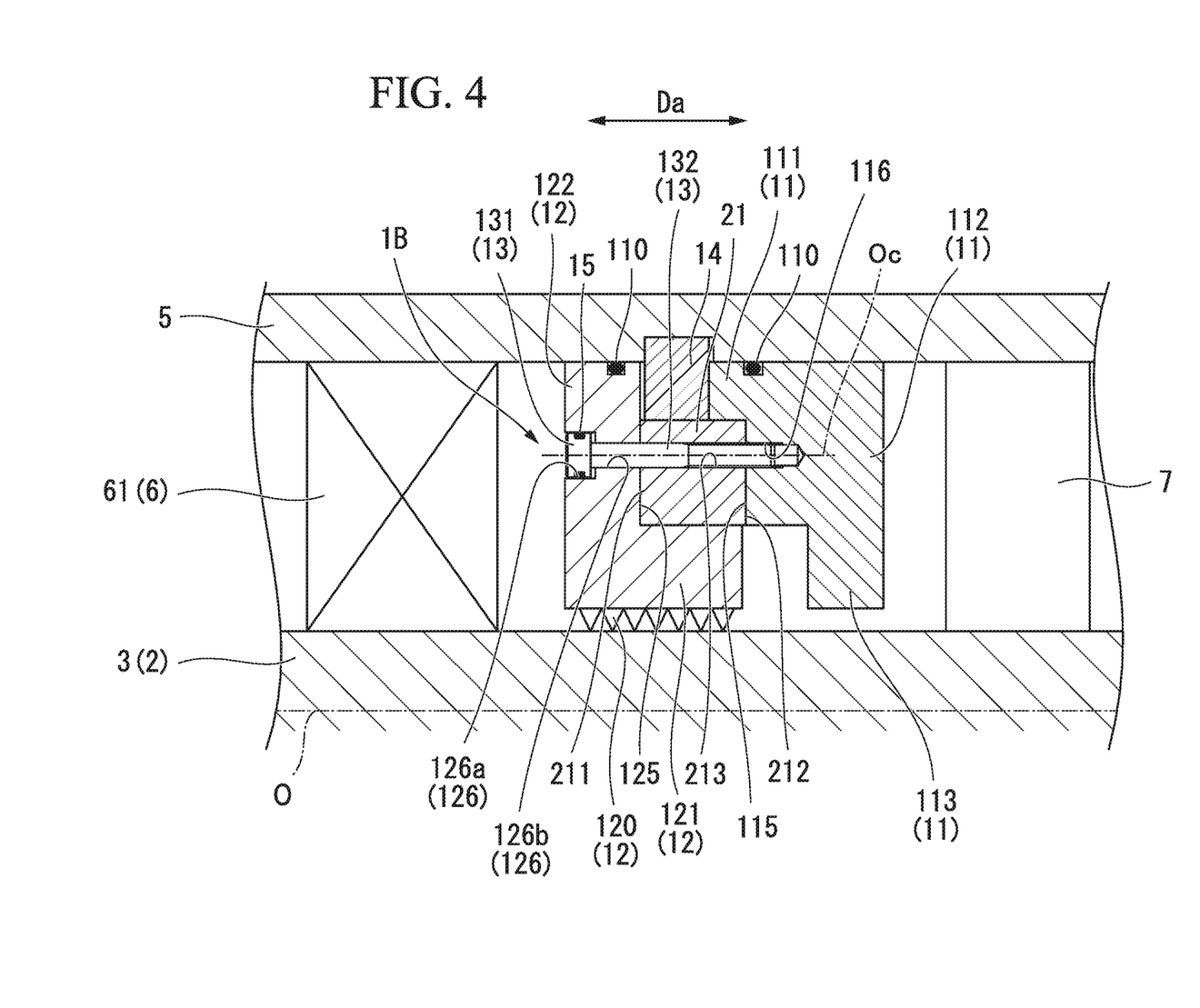
FIG. 4 is a cross-sectional view of a sealing device according to one or more embodiments of the invention.

The bolt sealing part 25 is not limited to the combination of the embodiments. For example, as a first modification example, a bolt sealing part 25 may be provided between the outer peripheral surface of the head portion 132 and the inner peripheral surface of the second through-hole 126b even in a case in which a sealing device 1B includes the ring member 21 as shown in FIG. 4. As in one or more embodiments, an O-ring, which is fixed to the head portion 132, is used as the bolt sealing part 25 of the first modification example. That is, the bolt sealing part 25 is not provided between the facing surface 125 and the labyrinth seal-facing surface 211 and between the fixing surface 115 and the fixing target part-facing surface 212, and is provided only between the outer peripheral surface of the head portion 132 and the inner peripheral surface of the second through-hole 126b. Accordingly, since the facing surface 125 and the labyrinth seal-facing surface 211 are in direct contact with each other, a gap between the facing surface 125 and the labyrinth seal-facing surface 211 is not sealed. Further, since the fixing surface 115 and the fixing target part-facing surface 212 are in direct contact with each other, a gap between the fixing surface 115 and the fixing target part-facing surface 212 is not sealed. Even in this structure, the sealing device 1B can obtain the same effects as the effects in accordance with one or more embodiments.

Figure 5:
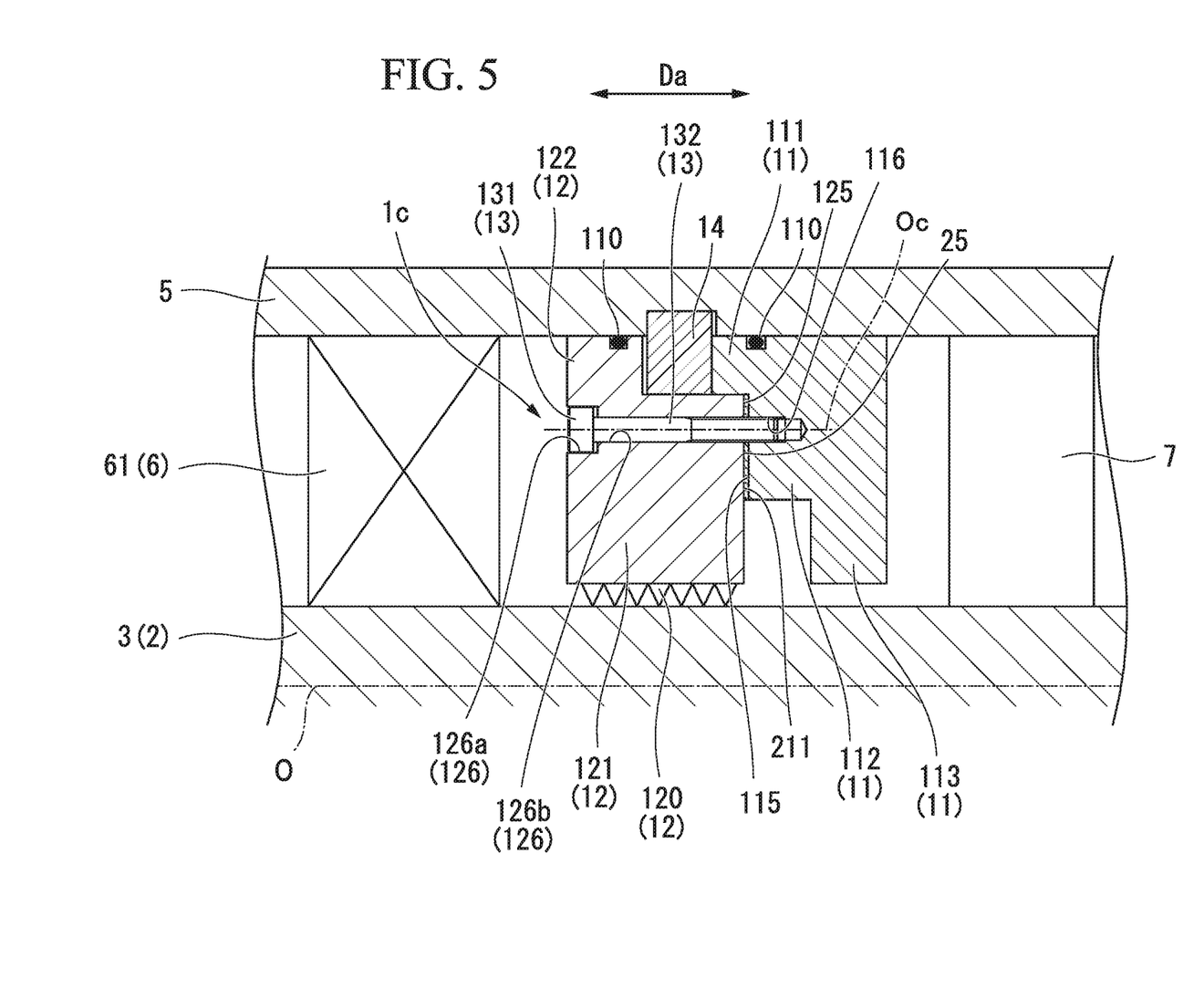
FIG. 5 is a cross-sectional view of a sealing device according to one or more embodiments of the invention.

Likewise, as a second modification example, a bolt sealing part 25 may be provided between the fixing surface 115 and the facing surface 125 even in a case in which a sealing device 1C does not include the ring member 21 as shown in FIG. 5. The bolt sealing part 25 of the second modification example may be a gasket that is directly provided between the fixing surface 115 and the facing surface 125. That is, the bolt sealing part 25 is not provided between the outer peripheral surface of the head portion 132 and the inner peripheral surface of the second through-hole 126b and may be provided only between the fixing surface 115 and the facing surface 125. Even in this structure, the sealing device 1C can obtain the same effects as the effects in accordance with one or more embodiments.

Further, the fastening bolt 13 may include a sealing washer. Accordingly, it is possible to seal a gap between the surface of the head portion 132 facing the inside of the machine in the axial direction Da and the opening portion of the second through-hole 126b facing the outside of the machine. Therefore, it is possible to further improve sealing performance.

Furthermore, the centrifugal compressor 100 has been described as an example of a rotating machine in accordance with one or more embodiments, but the rotating machine is not limited thereto. For example, the rotating machine may be a supercharger or a pump.

INDUSTRIAL APPLICABILITY

In the sealing device 1 and the rotating machine in accordance with one or more embodiments of the invention, it is possible to restrain lubricating oil from flowing in from a gap around the fastening bolt 13 without the impairment of assemblability.

REFERENCE SIGNS LIST

100: centrifugal compressor
O: axis
Da: axial direction
2: rotor
3: rotor body
4: impeller
4*a*: disc
4*b*: blade
4*c*: cover
5: casing
51: suction port
52: suction flow passage
53: diffuser flow passages
54: bent flow passage
55: return flow passage
56: discharge flow passage
57: discharge port
6: bearing unit
61: journal bearing
62: thrust bearings
7: main sealing part
1, 1A, 1B, 1C: sealing device
11: fixing target part
111: first fixing target portion
110: O-ring
112: second fixing target portion
115: fixing surface
116: fixing hole
113: third fixing target portion
12: sealing body
120: labyrinth seal portion
121: first body portion
125: facing surface
126: body through-hole
126*a*: first through-hole
126*b*: second through-hole
122: second body portion
13: fastening bolt
131: bolt body
132: head portion
Oc: central axis
14: stop ring
15, 25: bolt sealing part
21: ring member
211: labyrinth seal (first ring-facing surface)
212: fixing target part-facing surface (second ring-facing surface)
213: ring through-hole Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A sealing device disposed between a rotor extending along an axis as a center and a stator disposed on an outer peripheral side of the rotor, the sealing device comprising:
   a sealing body that seals a gap between the rotor and the stator;
   a fastening bolt that fixes the sealing body to the stator; and
   a bolt sealing part that covers a central axis of the fastening bolt and seals a gap around the fastening bolt,
   wherein the sealing body comprises:
      a facing surface facing a fixing surface of the stator in a direction along the axis; and
      a body through-hole in the sealing body that opens on the facing surface,
   wherein a head portion of the fastening bolt is inserted into the body through-hole and a tip portion of the fastening bolt is fixed to a fixing hole on the fixing surface,
   wherein the bolt sealing part is disposed in at least one of a gap between the head portion and an inner peripheral surface of the body through-hole and a gap between the fixing surface and the facing surface, and
   wherein the fastening bolt comprises:
      a sealing washer sealing between the head portion and a surface of the sealing body where the body through-hole is disposed.

2. The sealing device according to claim 1, wherein the bolt sealing part is an O-ring fixed to the head portion.

3. The sealing device according to claim 1, further comprising a ring member, the ring member comprising:
   a first ring-facing surface facing the facing surface;
   a second ring-facing surface facing the fixing surface; and
   a ring through-hole,
   wherein the fastening bolt is inserted in the ring through-hole and penetrates toward the second ring-facing surface from the first ring-facing surface,
   wherein the bolt sealing part is disposed between the facing surface and the first ring-facing surface, and between the fixing surface and the second ring-facing surface.

4. The sealing device according to claim 3, further comprising:
   a stop ring that positions the seal body in the axial direction with respect to the stator,
   wherein the ring member is disposed radially inward with respect to the stop ring.

5. A rotating machine comprising:
   the stator;
   the rotor that rotates in the stator; and
   the sealing device according to claim 1.

* * * * *